United States Patent [19]
Koizumi

[11] 3,982,032
[45] Sept. 21, 1976

[54] PROCESS FOR THE PRODUCTION OF RICE CRACKERS

[75] Inventor: Eiji Koizumi, Niigata, Kamedamachi, Japan

[73] Assignee: Kameda Seika Co., Ltd., Japan

[22] Filed: June 3, 1975

[21] Appl. No.: 583,428

Related U.S. Application Data

[63] Continuation of Ser. No. 418,923, Nov. 26, 1973, abandoned.

[52] U.S. Cl. .............................. 426/296; 426/439; 426/443; 426/458; 426/549
[51] Int. Cl.$^2$ ........................................ A21D 13/00
[58] Field of Search ........... 426/446, 443, 457, 458, 426/549, 560, 296, 439

[56] References Cited
UNITED STATES PATENTS 3,085,011   4/1963   Wayne .............................. 426/507

FOREIGN PATENTS OR APPLICATIONS 4,015,938   7/1965   Japan

*Primary Examiner*—Raymond N. Jones
*Attorney, Agent, or Firm*—Finnegan, Henderson, Farabow & Garrett

[57] ABSTRACT

An improved process for the production of rice-crackers using rice as the main raw material in which the waste wash water used to initially wash the rice is continuously recirculated for further use in washing fresh raw rice material until the recirculated wash water reaches a contaminate concentration in terms of chemical oxygen demand of up to about 40,000 ppm.

3 Claims, 1 Drawing Figure

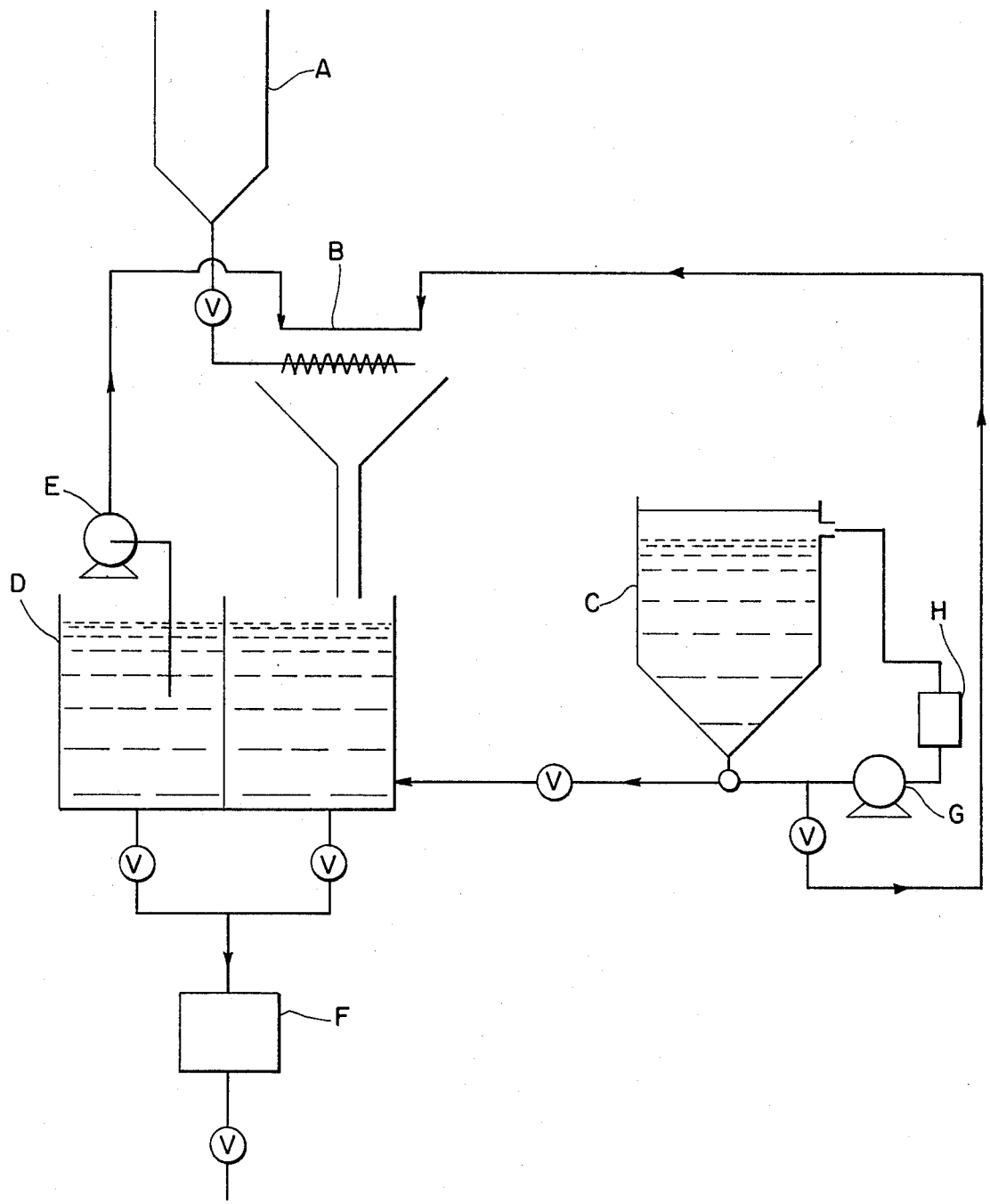

PROCESS FOR THE PRODUCTION OF RICE CRACKERS

This is a continuation of my copending application Ser. No. 418,923 filed Nov. 26, 1973, now abandoned.

The present invention relates to an improved process for production of rice-crackers using rice as the main material. More particularly it relates to the most suitable process for commercial production of rice-crackers of improved quality by introducing a novel means for washing rice therein.

In the preparation of rice crackers using rice as the main material, washing of the raw rice grains is thought to be a very important part because of its influence on the quality of the final product.

In the prior art, it was thought that fresh water was essential for cleaning the raw rice grains for rice product production and there was no problem in using a lot of fresh water to do so, thereby obtaining cleaned rice grains and a lot of waste water having high contents of COD and BOD. However, the amount of waste water is about 10 times as much as raw rice material and contamination thereof, for example, COD is about 3,000 ppm, and pollution problems are becoming very serious in recent years by environmental regulations. As many enterprises are seriously charged with the necessary cost for that purpose, it has been desirable to develop a suitable process for the production of novel rice-crackers.

However, nobody could not succeed in the development of a closed type process (recycled process) which is free of waste water for the production of rice-crackers directly from raw rice grains, because of the tremendous amount of fresh water consumption.

Accordingly, a first object of the present invention is to solve the problems of public contamination by clarifying a certain condition quantitatively, wherein the means for washing rice is carried out, in order to produce rice-crackers of good quality on a commercial scale. A second object is to provide the most suitable process for commercial production of rice-crackers of good quality from various kinds of starch. A third object is to provide novel rice-crackers having various tastes, shapes and textures by means of addition of any by-product to the main steps, if necessary.

Applicant found that fresh water washing is not essential for cleaning raw rice grains for the preparation of rice-crackers and further it has been found that rice-crackers of imroved quality can be produced while eliminating the pollution problem due to the discharge of wash water by recycling the wash water to the initial washing step in the process until the wash water reaches a contaminate concentration in terms of chemical oxygen demand of up to 40,000 ppm. Moreover, it has been found that after the contaminate concentration reaches a minimum level of around 20,000 ppm, valuable ingredients can be efficiently recovered and available as an additive to the raw rice material being processed while the remaining liquid can still be recycled for further use in the washing step.

The details of the present invention will be explained more apparently by the following description.

In general, puffed rice products can be obtained from the raw rice material through seven steps consisting of washing, steaming and kneading, cooling, shaping, drying, baking, and seasoning and drying. After being washed and soaked in water for a certain time, the raw rice material is steamed in a steamer. As well known, when the rice is steamed β-starch in it is converted to α-starch, arrangement of micells in the starch are broken, and thus the rice becomes pasty and viscous. When the steamed rice is kneaded, rice-dough material having homogeneous viscosity is prepared. The rice-dough material is transferred to a cooling step. After cooling and solidification in a refrigeration chamber or in water, the rice-dough material is shaped to a product with a cutting machine or punching tool. After the rice-dough material has been shaped, the material is introduced into a dryer and dried throughly. Thereafter the material is taken out from the dryer and baked at the baking step or fried in oil. After passing through the baking step, the material is seasoned with spreading liquid relishes such as soy, salad oil and others, and then dried. Thus final products are obtained. The additives like sesame, shrimp and cheese can be mixed or sprinkled on at the time when the rice flour is steamed and kneaded, or when the material is seasoned and dried after baking step. That is, the process for production of rice-crackers comprises each step of washing, steaming and kneading, cooling, shaping, drying, baking, and seasoning and drying.

According to the present invention, an improved process for the production of rice-crackers using rice as the main raw material is provided. The process consists of washing the raw rice material; steaming and kneading the washed rice; cooling the material prepared by the steaming and kneading; extruding and cutting the cooled material to any desired size, thickness and shape; drying the shaped material; baking or frying the dried material followed by seasoning and drying.

The said washing step is characterized by collecting the waste wash water used to wash the rice and recirculating it for further use in washing the raw rice material until the recirculated wash water reaches a contaminate concentration in terms of chemical oxygen demand of up to about 40,000 ppm.

The waste water of washing rice is contaminated to the extent that COD thereof is more than 20,000 ppm. The said waste water is subjected to a coagulation treatment and the produced supernatant liquid and/or coagulated precipitates can be mixed with various kinds of starch to give novel products with improved high yield. That is, the contamination of the waste water used in the invention, COD is desired to be more than 20,000 ppm and particularly preferable to be 40,000 ppm. For example, the following table shows the general components of a concentrated waste water of washing rice.

TABLE I

General components of a concentrated waste water of washing rice

| Water | 96.8 % | |
|---|---|---|
| Solid substance | 3.19 % | |
| Total nitrogen | 0.12 % | (3.76 %) |
| Total sugar | 1.89 % | (59.24 %) |

Note:
The figure in the parenthesis means percent based on dried substance.

Through the coagulation treatment of the concentrated waste water of washing rice, the supernatant liquid and coagulated precipitates can be produced. The concentrated waste water is divided into the supernatant liquid and coagulated precipitates with an acid such as hydrochloric acid or sulfuric acid. Thus obtained supernatant liquid contains sugar and amino acid as the main components and the COD is more than 4,000 ppm. The supernatant liquid is adjusted to almost neutral by neutralizing it with 2 % sodium hydroxide solution for recycling. On the other hand, the precipitates contain rice starch as the main components.

The above concentrated waste water, supernatant liquid or coagulated precipitates are mixed by adding to starch material, with or without addition of water in the step for steaming and kneading of the process for production of starch pellets. As additives, for example, the precipitates (calculated as dried solid substances) are preferably added to the raw material by about 1 – 2 %.

Referring to the drawing, FIG. 1 is an example of the apparatus for washing rice with water according to the present invention.

A is a tank of raw rice material. B is a rice-washer wherein the rice is washed with water supplied from a water tank D with a pump E and waste water is again sent back to the water tank D. The washed rice is soaked in a soaking tank C while water is cooled and circulated therein. The waste water of soaking rice is sent to the water tank D. Further it can be also sent to the rice-washer B and can be directly used for washing rice. F is a condenser, G is a pump for circulating the soaking water and H is a cooling apparatus.

The raw material employed for the present invention includes rice flour, corn starch, waxy corn starch, wheat starch, potato starch and sweet potato starch, and the mixture of two or more starch mentioned above can be used. Moreover, the above material can be mixed with a desired amount of grain flour such as wheat flour as the raw material.

The addition of the concentrated waste water of washing rice gives very good effects on the products. That is, it eliminates a characteristic corn smell of the product and odour of raw starch material such as wheat odour, due to the ingredients of the waste water such as sugar, amino acids, rice flour and protains (including a small amount of impurities). As the results, the product having such a taste as rice-crackers can be obtained. As is apparent from the foregoing Table I, sugar, amono acids and inorganic substances have influence on the baked color and smell of the products, and rice flour and amino acids improve structural texture of the products. Thus, according to the present invention, not only the problems caused by contaminated water can be completely dissolved, but also various kinds of novel rice-crackers can be obtained.

The embodiment of the present invention will be explained in the following examples.

EXAMPLE 1

4.5 kg of glutinuous rice was hulled to 91 %, washed five times with 22.5 kg of city water divided to 5 portions. The waste water of washing rice was collected and 4.5 kg of another polished glutinous rice was newly washed therewith. The washed waste water thus obtained was collected and further used repeatedly for washing fresh rice. Thus 21.5 kg of concentrated waste water was obtained after 6 times washing. Then the COD (by dichromate-value test) of the waste water was 46,4000 ppm and the content of solid substance was 3.19 %.

When the waste water (COD: 46,400 ppm) was adjusted to pH 4.8 by adding 10 % sulfuric acid, coagulation was occurred. The supernatant liquid (COD: 11,480 ppm) was neutralized with 2 % sodium hydroxide solution. On the other hand, the coagulated precipitates were adjusted to pH 7.0 and centrifugated to give precipitates containing water of 62 %.

Waxy corn and wheat flour (violet) were employed as the raw materials. When 6.45 kg of starch including the former (70 weight %) and the later (30 weight %) was mixed up in a mixer for rice-crackers, 2.01 kg of the above supernatant liquid was added to the material so that water-content thereof became 35 %. The steaming and kneading was carried out for 35 minutes and the subsequent steps were performed according to the usual methods to give final products.

On the other hand, 6.45 kg of starch including 70 % of glutinous rice flour and 30 % of waxy corn was prepared by mixing them in a rice-cracker mixer, and added thereto 200 g of the said precipitate to recycle the steaming and kneading step. Thus obtained product had no smells due to the waxy starch.

EXAMPLE 2

4.5 kg of glutinous rice was hulled to 91 %, washed five times with 22.5 kg of city water divided to 5 portions. The waste water of washing rice was collected and 4.5 kg of another polished glutinous rice was newly washed therewith. The washed waste water thus obtained was collected and further used repeatedly for washing fresh rice. Thus 21.5 kg of concentrated waste water was obtained after 6 times washing. Then the COD (by dichromate-value test) of the waste water was 46,400 ppm and the content of solid substance was 3.19 %.

When the waste water (COD: 46,400 ppm) was adjusted to pH 4.8 by adding 10 % sulfuric acid, coagulation was occurred. The supernatant liquid (COD: 11,480 ppm) was neutralized with 2 % sodium hydroxide solution. On the other hand, the coagulated precipitates were adjusted to pH 7.0 and centrifugated to give precipitates containing water of 62 %. The supernatant water was further recycled for fresh rice washing, until the COD reached in the range from 20,000 ppm to 40,000 ppm.

On the other hand, far long-stored non-glutinous rice was crushed, washed with water, soaked in water and milled in a pressure roll according to the usual manners. To 7.41 kg of the far long-stored rice flour thus obtained (water- content: 25.8 %), there was added 0.176 kg of the above precipitate and the mixture was steamed and kneaded for 5 minutes in accordance with the ordinary manner. The material was cooled, extruded, rolled, shaped and dried at 70°C. The obtained material containing about 20 % water was allowed to stand over night (aging), dried again as far as water-content thereof became 13 % and baked. Thus obtained product had no undesirable smell due to long time storage deterioration.

EXAMPLE 3

4.5 kg of glutinous rice was hulled to 91 %, washed 5 times with 22.5 kg of city water divided to 5 portions. The waste water of washing rice was collected and 4.5 kg of another polished glutinous rice was newly washed therewith. The washed waste water thus obtained was collected and further used repeatedly for washing fresh rice. Thus 21.5 kg of concentrated waste water was obtained after 6 times washing. Then the COD (by dichromate-value test) of the waste water was 46,400 ppm and the content of solid substance was 3.19 %.

When the waste water (COD: 46,400 ppm) was adjusted to pH 4.8 by adding 10 % sulfuric acid, coagulation was occurred. The supernatant liquid (COD: 11,480 ppm) was neutralized with 2 % sodium hydroxide solution. On the other hand, the coagulated precipitates were adjusted to pH 7.0 and centrifugated to give precipitates containing water of 62 %.

The precipitates were recycled as the additives for the steaming and kneading step, and the supernatant liquid (COD: 11,480 ppm) was recycled for further use until the COD content reached in the range from COD 20,000 ppm to 40,000 ppm.

For the references, the qualities of the product in the above examples were compared with the conventional product by using a fresh city water (COD: 0 ppm) as the washing water by feeling test. The results obtained were as follows:

|  | Reference (City Water) | Waste Water COD: 20,000 ppm | Waste Water COD: 40,000 ppm |
|---|---|---|---|
| Appearance | ++++ | ++++ | +++ |
| Flavor | +++ | ++++ | +++ |
| Texture Feeling | ++++ | ++++ | ++++ |
| General Impression | ++++ | ++++ | ++++ |

(Note) ++++ > +++

As is illustrated above in detail, the quality of the products according to the present invention is not so influenced by the use of the recycled supernatant water and thus, the present invention completely solves the pollution problems in the rice-product industries.

What is claimed is:

1. In a process for the production of rice-crackers using rice as the main raw material, said process consisting of washing the raw rice material; steaming and kneading the washed rice; cooling the material prepared by the steaming and kneading; extruding and cutting the cooled material to any desired size, thickness and shape; drying the shaped material; and baking or frying the dried material, followed by seasoning and drying, the improvement comprising continuously collecting the waste wash water used in the washing step to wash the rice and recirculating it for further use in washing fresh raw rice material until the recirculated wash water reaches a contaminate concentration in terms of chemical oxygen demand of up to about 40,000 ppm.

2. The process of claim 1, in which the recirculating concentrated wash water containing a contaminate concentration of at least 20,000 ppm is coagulated with an acid to recover valuable ingredients as coagulated precipitates, and the coagulated precipitates are reused as an additive to the raw rice material following washing in an amount of from 1% to 2% based on the weight of the rice.

3. The process of claim 2, in which the supernatant liquid resulting from the coagulation of the concentrated wash water is recycled for further use in washing fresh rice.

* * * * *